US012587054B2

(12) United States Patent
Ferrara et al.

(10) Patent No.:  US 12,587,054 B2
(45) Date of Patent:  Mar. 24, 2026

(54) THREE-PHASE STATOR WINDING OF A ROTARY ELECTRIC MACHINE

(71) Applicant: FERRARI S.P.A., Modena (IT)

(72) Inventors: Davide Ferrara, Modena (IT); Paolo Faverzani, Modena (IT); Enrico Allio, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 274 days.

(21) Appl. No.: 18/462,940

(22) Filed: Sep. 7, 2023

(65) Prior Publication Data

US 2024/0088735 A1    Mar. 14, 2024

(30) Foreign Application Priority Data

Sep. 12, 2022    (IT) ......................... 102022000018525

(51) Int. Cl.
H02K 3/28        (2006.01)
H02K 1/12        (2006.01)
H02K 3/38        (2006.01)

(52) U.S. Cl.
CPC ................. H02K 3/28 (2013.01); H02K 1/12 (2013.01); H02K 3/38 (2013.01); *H02K 2203/09* (2013.01)

(58) Field of Classification Search
CPC .. H02K 3/28; H02K 1/12; H02K 3/38; H02K 2203/09
See application file for complete search history.

(56) References Cited

U.S. PATENT DOCUMENTS

| | | | | | |
|---|---|---|---|---|---|
| 6,239,528 | B1 * | 5/2001 | Sawada | .................... | H02K 3/04 310/179 |
| 2008/0150377 | A1 * | 6/2008 | Yamaguchi | ............ | H02K 3/522 310/43 |
| 2012/0286593 | A1 | 11/2012 | Yokogawa et al. | | |
| 2015/0332841 | A1 * | 11/2015 | Hasegawa | ................ | H01F 5/00 307/104 |

FOREIGN PATENT DOCUMENTS

WO        2014041265  A2     3/2014

OTHER PUBLICATIONS

Italian Search Report for Application No. 102022000018525, Filing Date: Sep. 12, 2022; Date of Mailing: Apr. 28, 2023, 8 pages.

* cited by examiner

*Primary Examiner* — Tulsidas C Patel
*Assistant Examiner* — Mohammed Ahmed Qureshi
(74) *Attorney, Agent, or Firm* — CANTOR COLBURN LLP

(57)        ABSTRACT
Three-phase stator winding of a rotary electric machine and having: a plurality of coils each of which has two opposite ends; a plurality of first connection bridges, each of which defines a star connection of three coils and constitutes a star centre of the three coils by connecting a first end of each of the three coils to one another; and three second connection bridges which define a parallel connection of the star connections, are each provided with a corresponding pin defining a terminal of the three-phase stator winding towards the outside, and each of which connects a second end of a respective coil of each star connection to one another. Each second connection bridge has a seamless circular shape closed onto itself.

15 Claims, 12 Drawing Sheets

THREE-PHASE STATOR WINDING OF A ROTARY ELECTRIC MACHINE

CROSS-REFERENCE TO RELATED APPLICATIONS

This patent application claims priority of Italian patent application no. 102022000018525 filed on 12 Sep. 2022, the content of which is incorporated herein by reference.

FIELD OF THE ART

The present invention relates to a three-phase stator winding of a rotary electric machine.

The present invention finds advantageous application to a rotary electric machine for automotive that is installed on board a vehicle and can be used as a motor (by absorbing electrical energy and generating a mechanical drive torque) or as a generator (by converting mechanical energy into electrical energy).

PRIOR ART

A rotary electric machine for automotive comprises a shaft, which is mounted rotatable to rotate around a central rotation axis, a generally permanent magnet rotor keyed to the shaft to rotate together with the shaft, and a stator arranged around the rotor to enclose in its inside the rotor. Patent applications US2008150377A1, WO2014041265A2 and US2012286593A1 describe a three-phase stator winding of a rotary electric machine and having a plurality of coils and four connection bridges, each of which is connected to terminals of the coils and has a seamless circular shape closed onto itself.

DISCLOSURE OF THE INVENTION

Aim of the present invention is to provide a three-phase stator winding of a rotary electric machine that has a high energy efficiency and a high specific performance (power and/or torque), allows to realize a compact and lightweight rotary electric machine, and is easily realizable in a highly automated production plant.

According to the present invention there is provided a three-phase stator winding of a rotary electric machine, according to what is claimed in the appended claims.

The claims describe preferred embodiments of the present invention forming an integral part of the present description.

BRIEF DESCRIPTION OF THE DRAWINGS

The present invention will now be described with reference to the enclosed drawings, showing some non-limiting embodiments thereof, wherein.

PREFERRED EMBODIMENTS OF THE INVENTION

Figure 1:
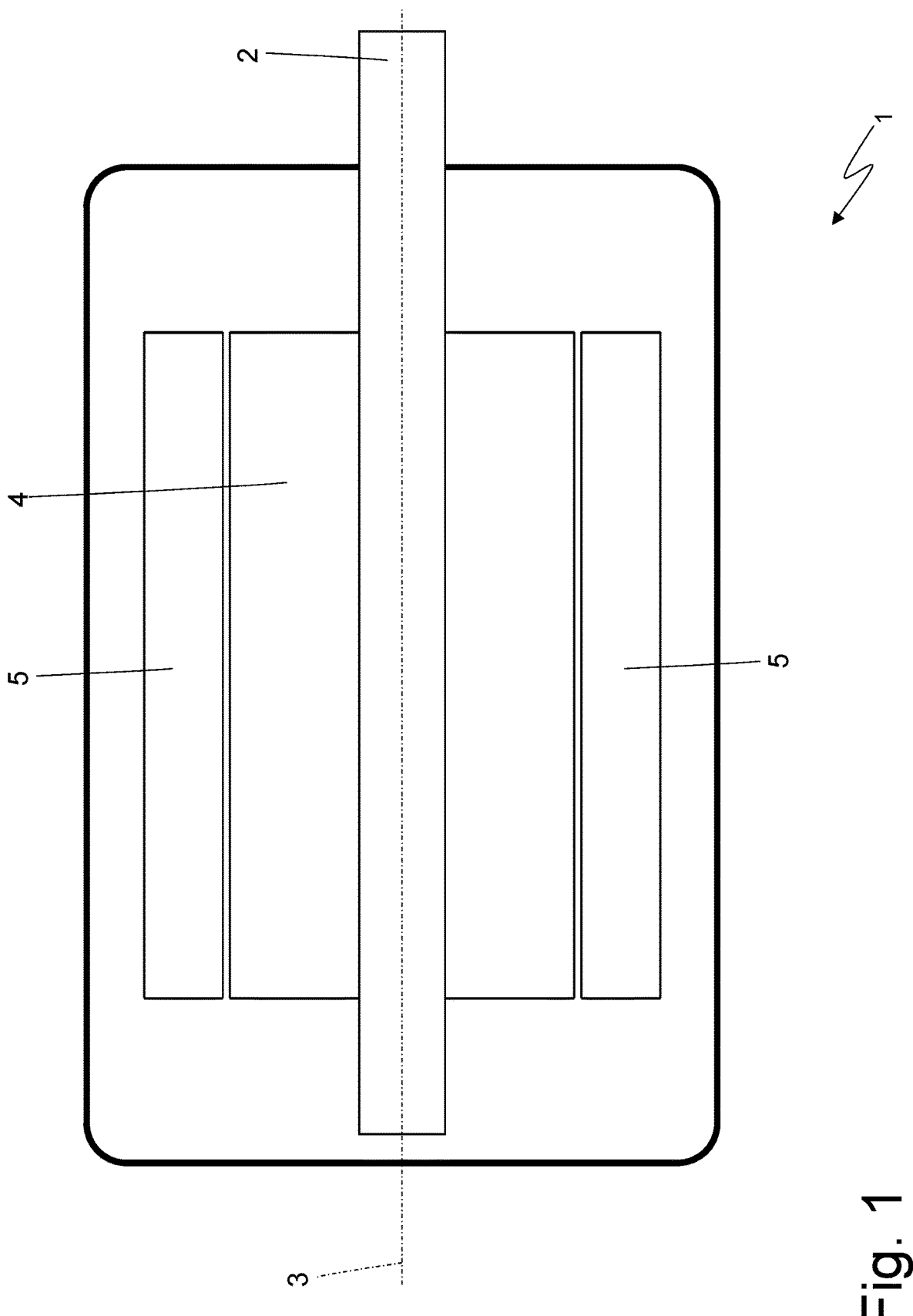
FIG. 1 is a schematic view in longitudinal section of a rotary electric machine realized.

In FIG. 1, number 1 denotes as a whole a reversible-type synchronous electric machine for automotive (that is, it can function both as an electric motor by absorbing electrical energy and generating a drive mechanical torque, and as an electric generator by absorbing mechanical energy and generating electrical energy).

The electric machine 1 is intended to be installed in an electric drive vehicle comprising at least two drive wheels (i.e. in a two-wheel drive or four-wheel drive electric drive vehicle). In particular, the electric machine 1 can be connected to the drive wheels (directly or by means of a transmission possibly provided with a clutch); that is, between the electric machine 1 and the drive wheels there can be a direct connection, there can be a simple speed reducer, or there can also be a clutch.

The electric machine 1 comprises a shaft 2, which is mounted rotatable to rotate around a central rotation axis 3, a permanent magnet rotor 4 keyed to the shaft 2 to rotate together with the shaft 2, and a stator 5 of cylindrical tubular shape arranged around the rotor 4 to enclose in its inside the rotor 4. Between the rotor 4 and the stator 5 there is defined an air gap of annular shape and having a reduced thickness (normally the minimum required in order to safely allow the rotation of the rotor 4 inside the stator 5).

Figure 2:
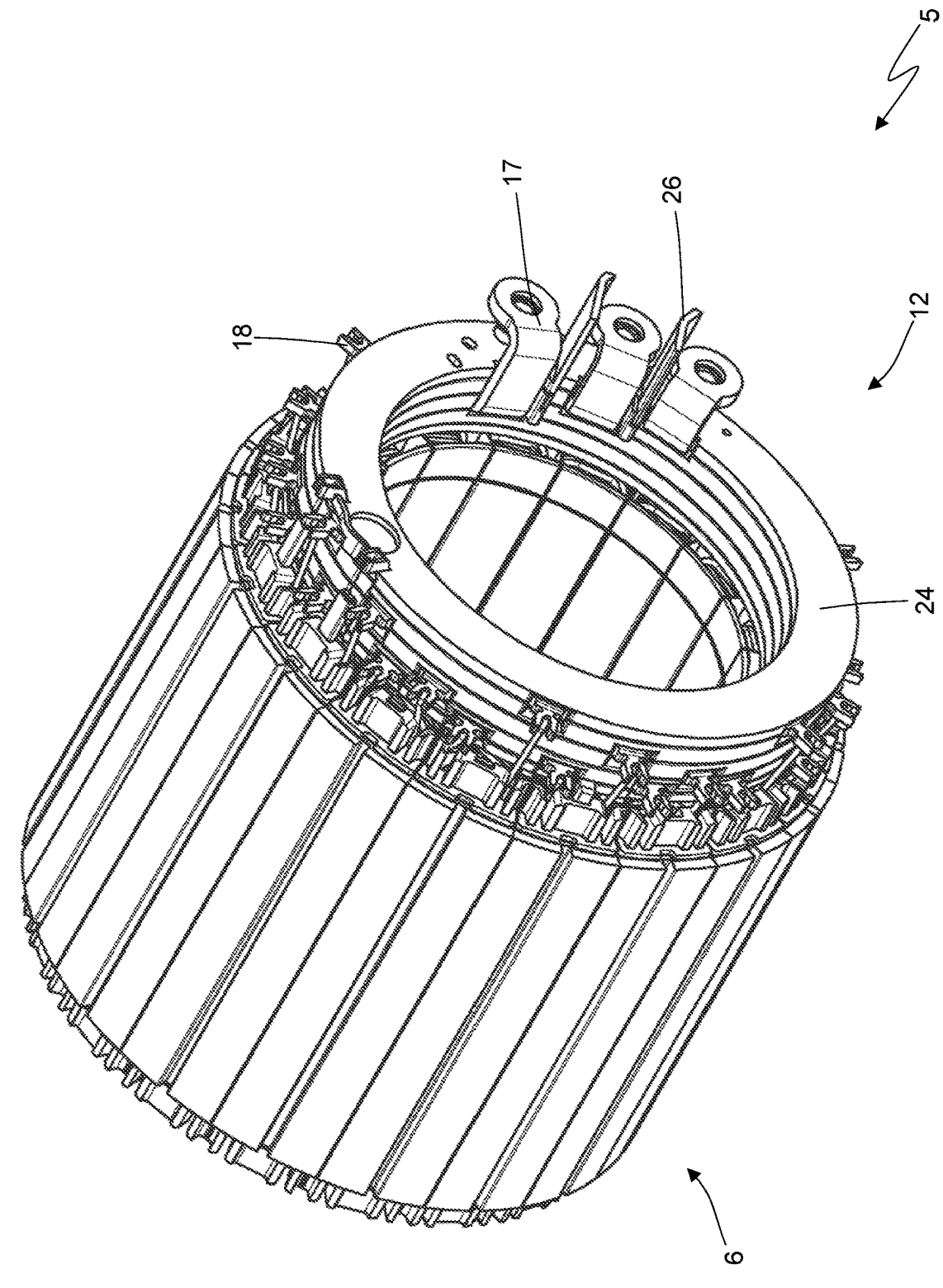
FIGS. 2 and 3 are two perspective views of a stator provided with a three-phase stator winding of the rotary electric machine of FIG. 1.
Figure 3:
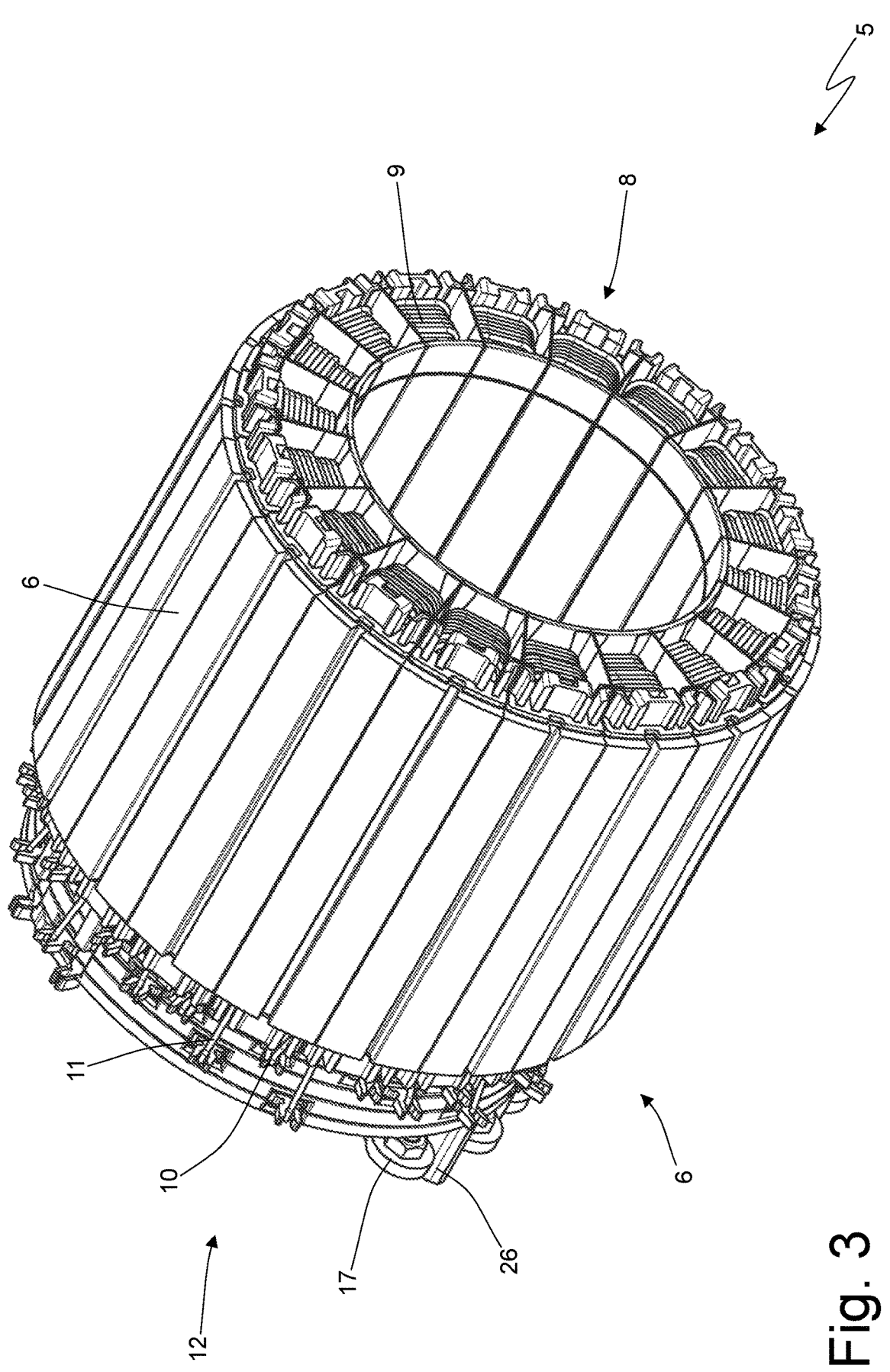
Figure 4:
FIG. 4 is a cross-sectional view of the stator provided with the three-phase stator winding of FIGS. 2 and 3.

According to what is shown in FIGS. 2 and 3, the stator 5 comprises a magnetic core 6 which is formed by a series of metal sheets (constituted by ferromagnetic material) that are clamped into a stack (i.e. stacked together). The magnetic core 6 comprises a plurality of salient magnetic poles 7 (also called pole expansions), each of which protrudes radially towards the rotor 4 and is better visible in FIG. 3. In the embodiment shown in the appended figures there are eighteen magnetic poles 7, but of course a different number of magnetic poles 7 can be provided.

Figure 10:
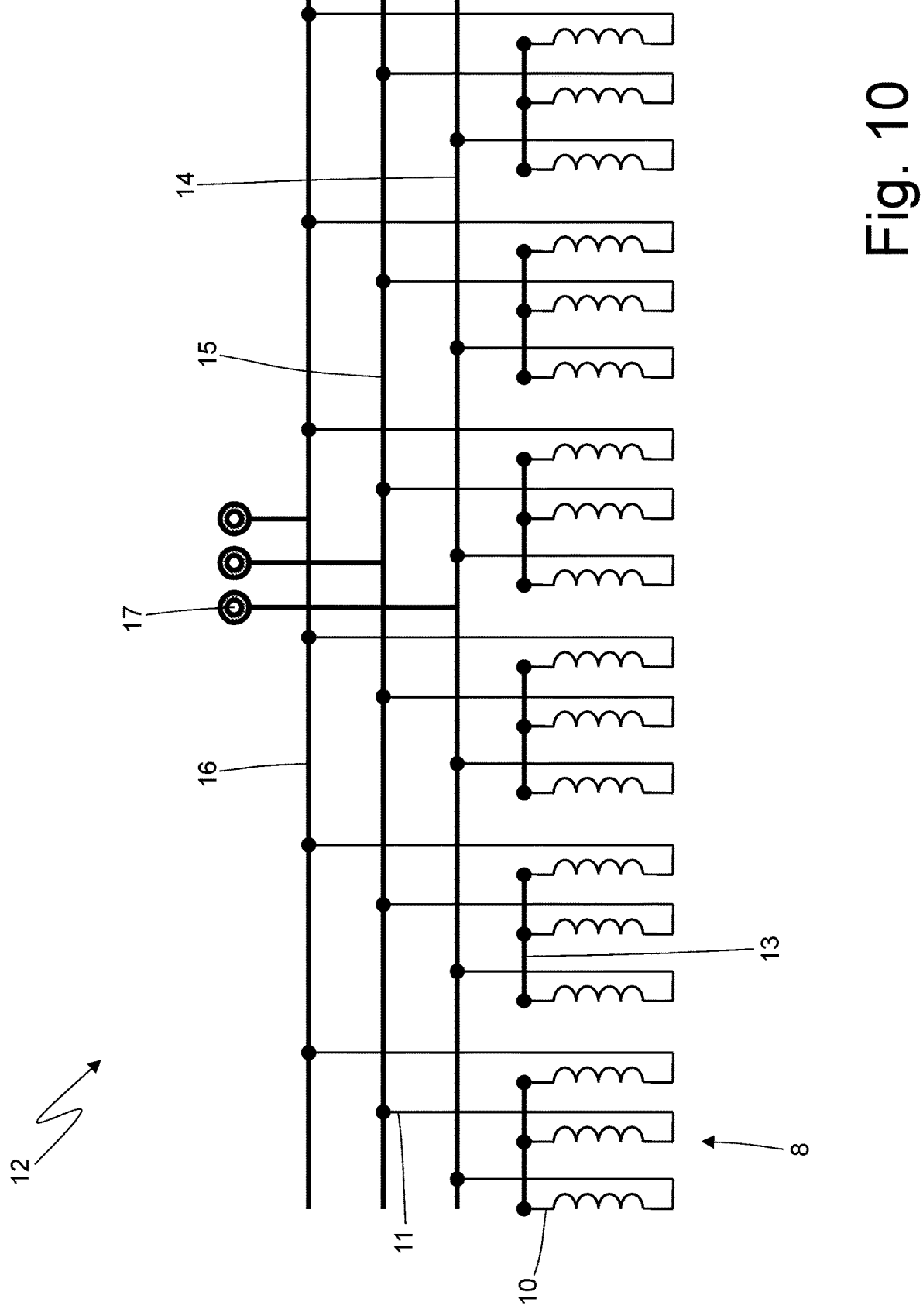
FIG. 10 is an electrical diagram of the three-phase stator winding of FIGS. 2 and 3.

According to what is better shown in FIG. 3, around each magnetic pole 7 there is arranged a corresponding coil 8 which is constituted by a conductor cable 9 (externally insulated) that is wound around the magnetic pole 7 to form a certain number of turns wound around the magnetic pole 7; each coil 8 has two ends 10 and 11 that constitute the two extremities of the conductor cable 9 and define the beginning and the end of the coil 8. According to the embodiment shown in the appended figures, the ends 10 and 11 of the coils 8 are all arranged on the same side of the magnetic core 6 and therefore on the same side of the magnetic core 6 there are also arranged all the connections between the coils 8 to form a three-phase stator winding 12 (schematized in FIG. 10); i.e. the ends 10 and 11 of the coils 8 and the respective connections are all arranged in the area of the same head of the three-phase stator winding 12. According to a different embodiment not shown, the ends 10 and 11 of the coils 8 are partly arranged on one side of the magnetic core 6 and partly arranged on the other side of the magnetic core 6 and therefore also the connections between the coils 8 to form the three-phase stator winding 12 are located on both sides; i.e. the ends 10 and 11 of the coils 8 and the respective connections are arranged in the area of both heads of the three-phase stator winding 12.

Figure 5:
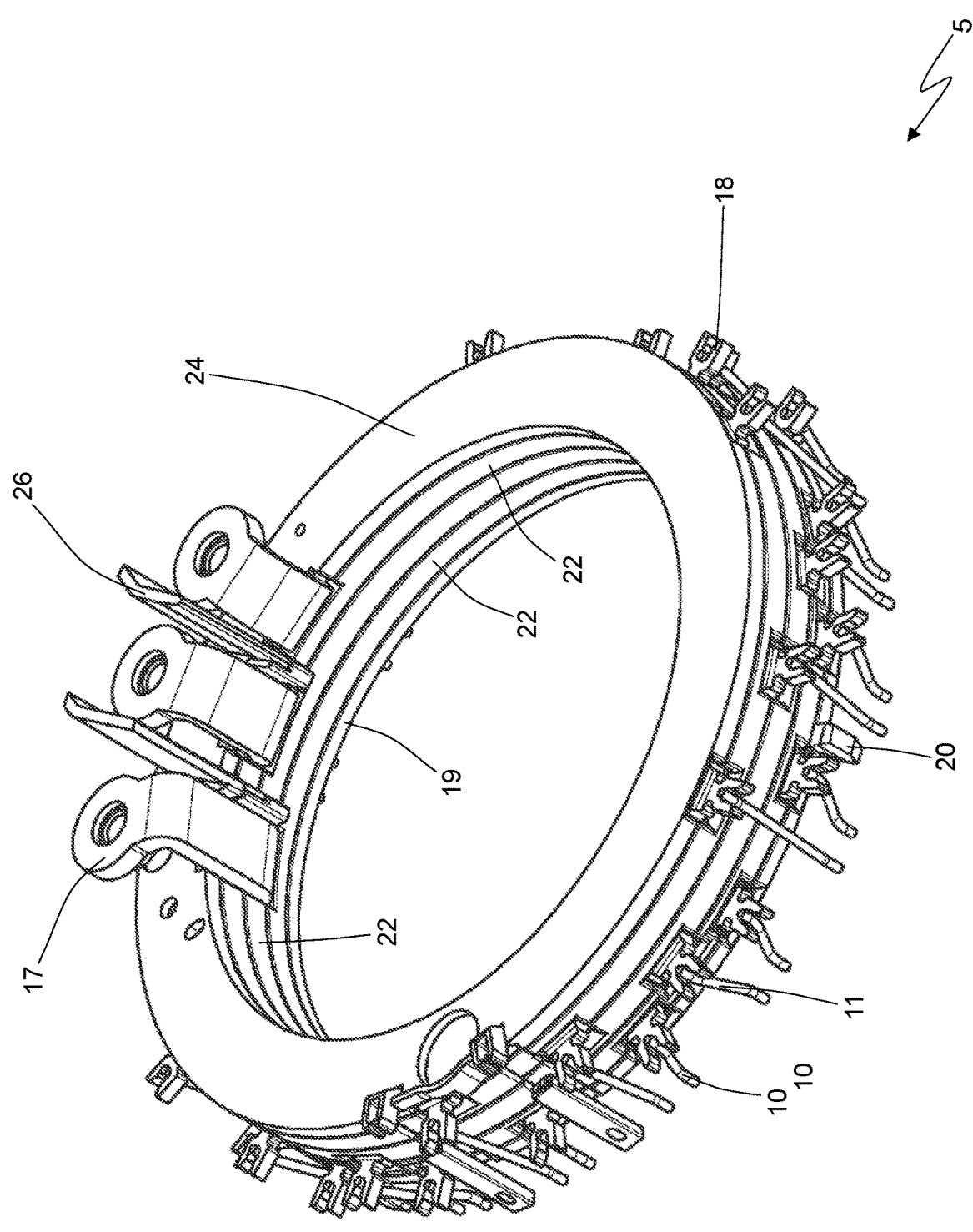
FIG. 5 is a perspective view of a set of connection bridges of the three-phase stator winding of FIGS. 2 and 3.
Figure 6:
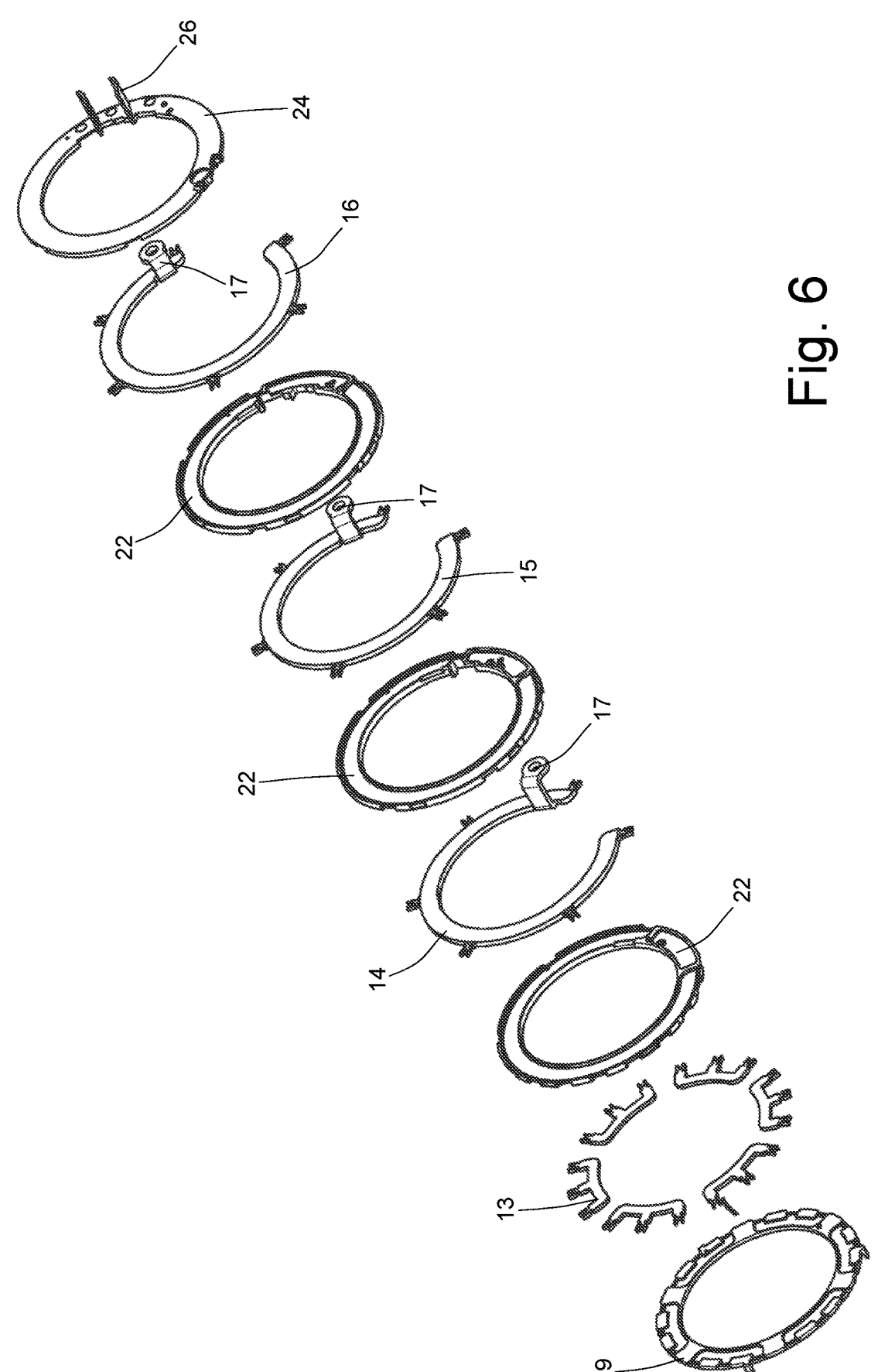
FIG. 6 is an exploded perspective view of the connection bridges of FIG. 5 according to a variant which is not part of the present invention.

According to what is shown in FIGS. 5 and 6, in the area of the ends 10 and 11 of the coils 8 (i.e. in the area of the same head of the three-phase stator winding 12) a series of connection bridges 13-16 are arranged which have a circular (annular) shape and are electrically connected to the ends 10 and 11 of the coils 8 to realize the three-phase stator winding 12.

There are provided six connection bridges 13 which define corresponding star centres of the three-phase stator winding 12 so as to constitute six-star connections each composed of three coils 8; in particular, each connection bridge 13 connects the ends 10 of three coils 8 to one another which are thus star-connected to each other. There are also provided three connection bridges 14, 15 and 16 which define a parallel connection of the six star connections and are each provided with a corresponding pin 17 defining a terminal of the three-phase stator winding 12 towards the outside; in particular, each connection bridge 14, 15 or 16 connects the ends 11 of six coils 8 to one another (each of which belongs to a corresponding star of three coils 8).

According to a preferred embodiment, each connection bridge 13-16 is constituted by a flat plate that is arranged perpendicularly to the central rotation axis 3 of the electric machine 1, has a circular shape (in particular shaped as a more or less extended arc of circumference) coaxial to the central rotation axis 3 of the electric machine 1, and has externally a series of crimping forks 18 that project radially cantilevered from the connection bridge 13-16 towards the outside and engage the ends 10 and 11 of the coils 8; i.e. the ends 10 and 11 of the coils 8 are inserted and locked inside the crimping forks 18. According to a possible embodiment, once the end 10 or 11 of a coil is inserted into a crimping fork 18, the crimping fork 18 is tightened around the end 10 or 11 (by means of a plastic and therefore permanent deformation) to lock the end 10 or 11 inside the crimping fork 18 with no need to perform welds. According to an alternative embodiment, once the end 10 or 11 of a coil is inserted into a crimping fork 18, a weld is performed to better lock the end 10 or 11 inside the crimping fork 18.

In other words, according to a preferred embodiment, each connection crimping fork 18 is "U" shaped and is adapted to receive and house a corresponding end 10 or 11 (i.e. an extremity of a conductor cable 9 constituting a coil 8). Each crimping fork 18 initially has a cross-section larger than the cross-section of the corresponding end 10 or 11 so that the end 10 or 11 can enter inside the crimping fork 18 with a certain play; in other words, each crimping fork 18 is initially larger than the corresponding end 10 or 11 to house the end 10 or 11 with play and thus to allow easy entry of the end 10 or 11. Once an end 10 or 11 has been inserted in a corresponding crimping fork 18, the crimping fork 18 is tightened by means of plastic deformation to clamp the end 10 or 11 (i.e. to firmly adhere to the end 10 or 11); in particular, by means of a special clamp the crimping fork 18 is deformed against the end 10 or 11 to be in close contact (even with a certain pressure) with the end 10 or 11. In this way, on the one hand it is possible to easily insert the ends 10 and 11 in the corresponding crimping forks 18 and on the other hand it is possible to ensure a stable and slit-free mechanical coupling between the ends 10 and 11 and the corresponding crimping forks 18. In other words, thanks to the fact that the crimping forks 18 are initially larger than the ends 10 and 11 it is easy and fast (therefore easily automatable) to couple the ends 10 and 11 to the crimping forks 18; moreover, thanks to the fact that the crimping forks 18 are plastically deformed to clamp the corresponding ends 10 and 11 it is always possible to obtain an optimal (mechanical and therefore electrical) contact between the crimping forks 18 and the corresponding ends 10 and 11.

Figure 7:
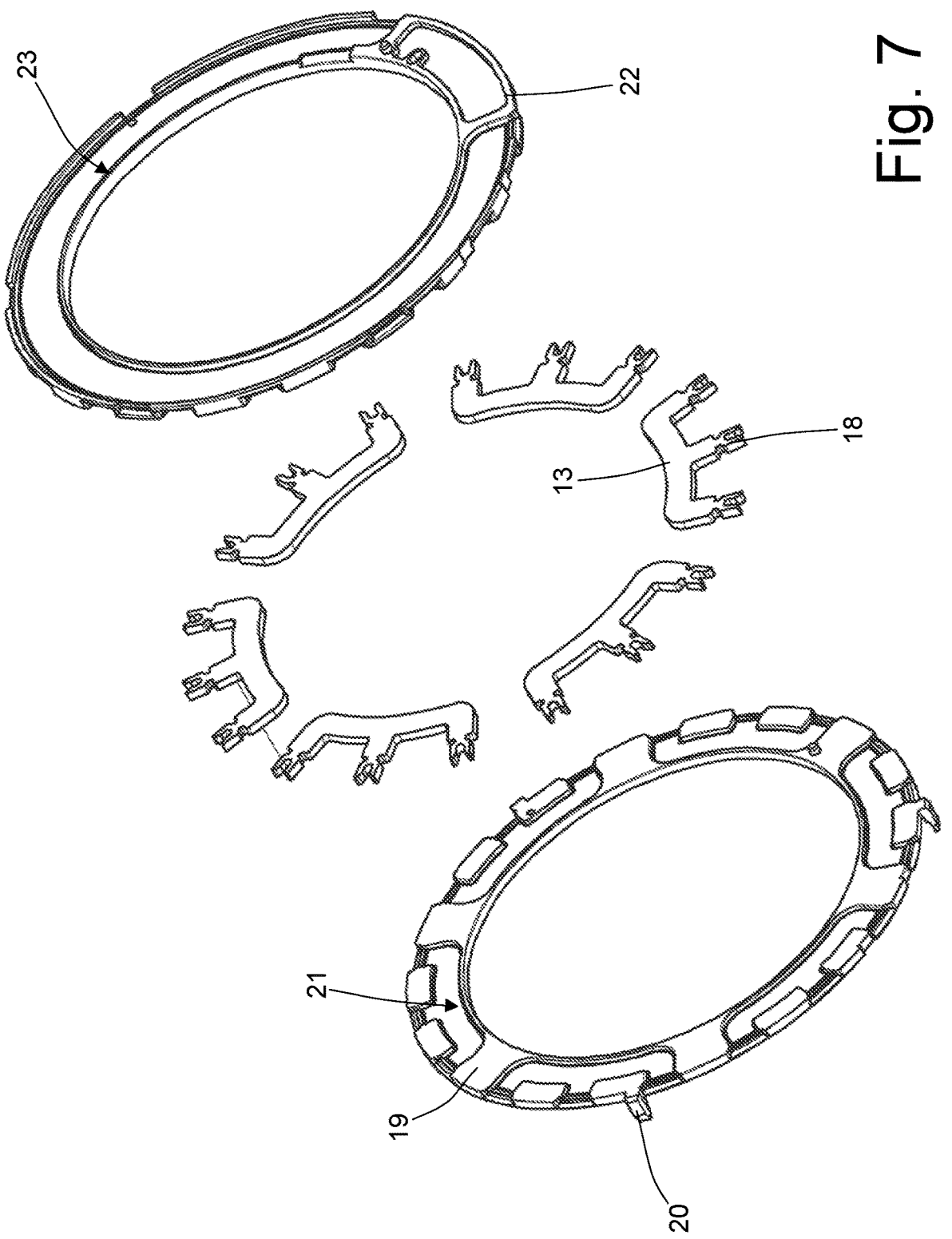
FIGS. 7, 8 and 9 are enlarged scale views of details of FIG. 6.

According to what is better shown in FIG. 7, the six connection bridges 13 are arranged coplanar with each other side by side and all together make up a circumference (obviously interrupted between two adjacent connection bridges 13 to prevent two adjacent connection bridges 13 from touching).

There is provided an internal insulating support 19, which houses the connection bridges 13 and is interposed between the magnetic core 6 and the connection bridges 13. According to a preferred embodiment, the internal insulating support 19 is made of moulded plastic material which is electrically insulating. The internal insulating support 19 has an annular and circular shape coaxial to the central rotation axis 3 of the electric machine 1, i.e. it is a seamless (i.e. without interruptions) round ring. The internal insulating support 19 has legs 20 (in particular four legs 20) that extend axially from the internal insulating support 19 towards the magnetic core 6 and engage the external surface of the magnetic core 6 to radially angularly lock (constrain) the internal insulating support 19 to the magnetic core 6. The internal insulating support 19 comprises a plurality of seats 21, each of which reproduces in negative the shape of a corresponding connection bridge 13 and houses the corresponding connection bridge 13; in particular, each seat 21 has openings towards the outside through which the crimping forks 18 of a corresponding connection bridge 13 can come out radially towards the outside.

Figure 8:
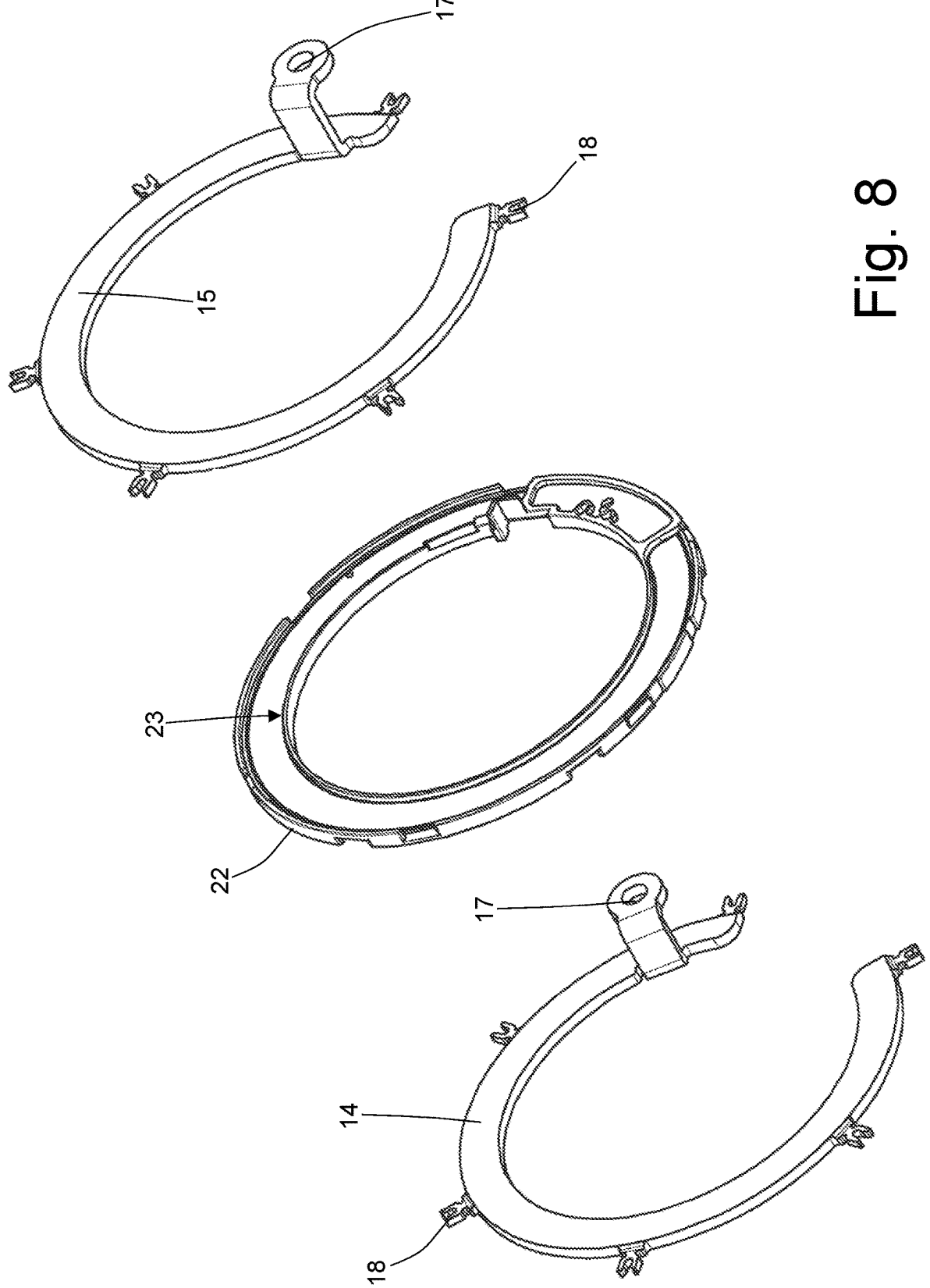
Figure 9:
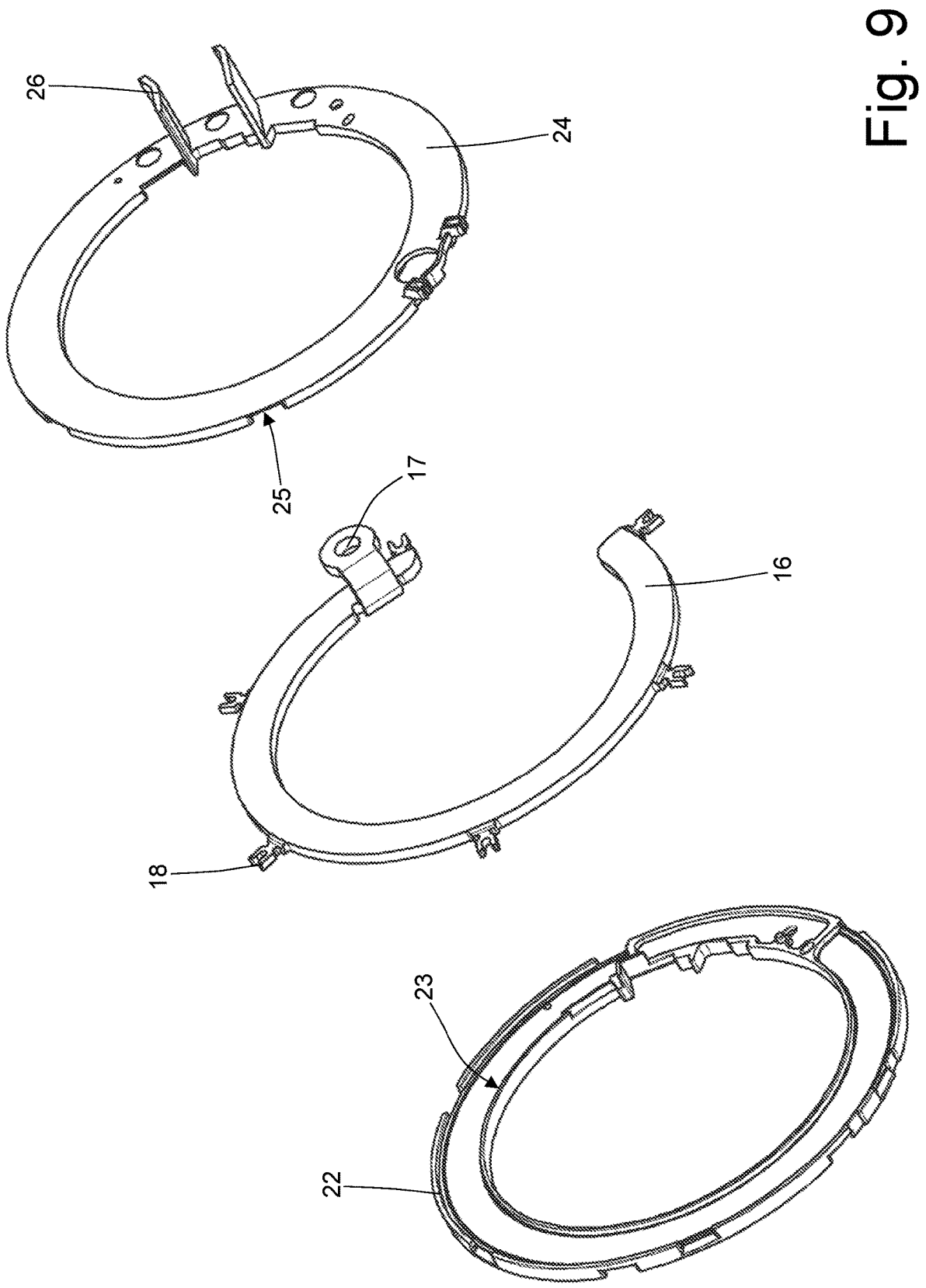

According to what is better shown in FIGS. 7, 8 and 9 (which show a variant not forming part of the present invention), each connection bridge 14, 15 or 16 has an open circular shape (i.e. with an interruption in the continuity) and the corresponding pin 17 projects axially and radially from the connection bridge 14, 15 or 16; preferably, in each connection bridge 14, 15 or 16 the corresponding pin 17 projects radially from a radially internal surface of the connection bridge 14, 15 or 16 so as to be inside the connection bridge 14, 15 or 16. The connection bridges 13-16 are arranged axially stacked one above the other and three intermediate insulating supports 22 are interposed between the connection bridges 13-16. Each intermediate insulating support 22 has an annular and circular shape coaxial to the central rotation axis 3 of the electric machine 1, i.e. it is a seamless round ring (i.e. without interruptions). Each intermediate insulating support 22 comprises on both sides respective seats 23, each of which reproduces in negative the shape of a corresponding connection bridge 13-16 and houses the corresponding connection bridge 13-16; in particular, each seat 23 has openings towards the outside through which the crimping forks 18 of a corresponding connection bridge 13-16 can come out radially towards the outside.

There is provided an external insulating support 24, which covers the (axially) outermost connection bridge 16. According to a preferred embodiment, the external insulating support 24 is made of moulded plastic material which is electrically insulating. The external insulating support 24 has an annular and circular shape coaxial to the central rotation axis 3 of the electric machine 1, that is, it is a seamless round ring (i.e. without interruptions). The external insulating support 24 comprises a seat 25 that reproduces in negative the shape of the axially outermost connection bridge 16 and houses the axially outermost connection bridge 16; in particular, the seat 25 has openings towards the outside through which the crimping forks 18 of the axially outermost connection bridge 16 can come out radially towards the outside. According to a preferred embodiment, the external insulating support 24 has two separation panels 26 that rise axially from the external insulating support 24 and are interposed between the pins 17 (as better shown in FIG. 5).

According to a preferred embodiment, the insulating supports 22, 24 and 26 are shaped to couple (interlock, join) together and thus realize a single structure that encloses in its inside the connection bridges 13-16 (as shown in FIG. 5).

In the embodiment shown in FIGS. 6-9 which does not form part of the present invention, the connection bridges 14, 15 and 16 have an open circular shape, i.e. they do not close onto themselves, there being an interruption in their continuity.

Figure 11:
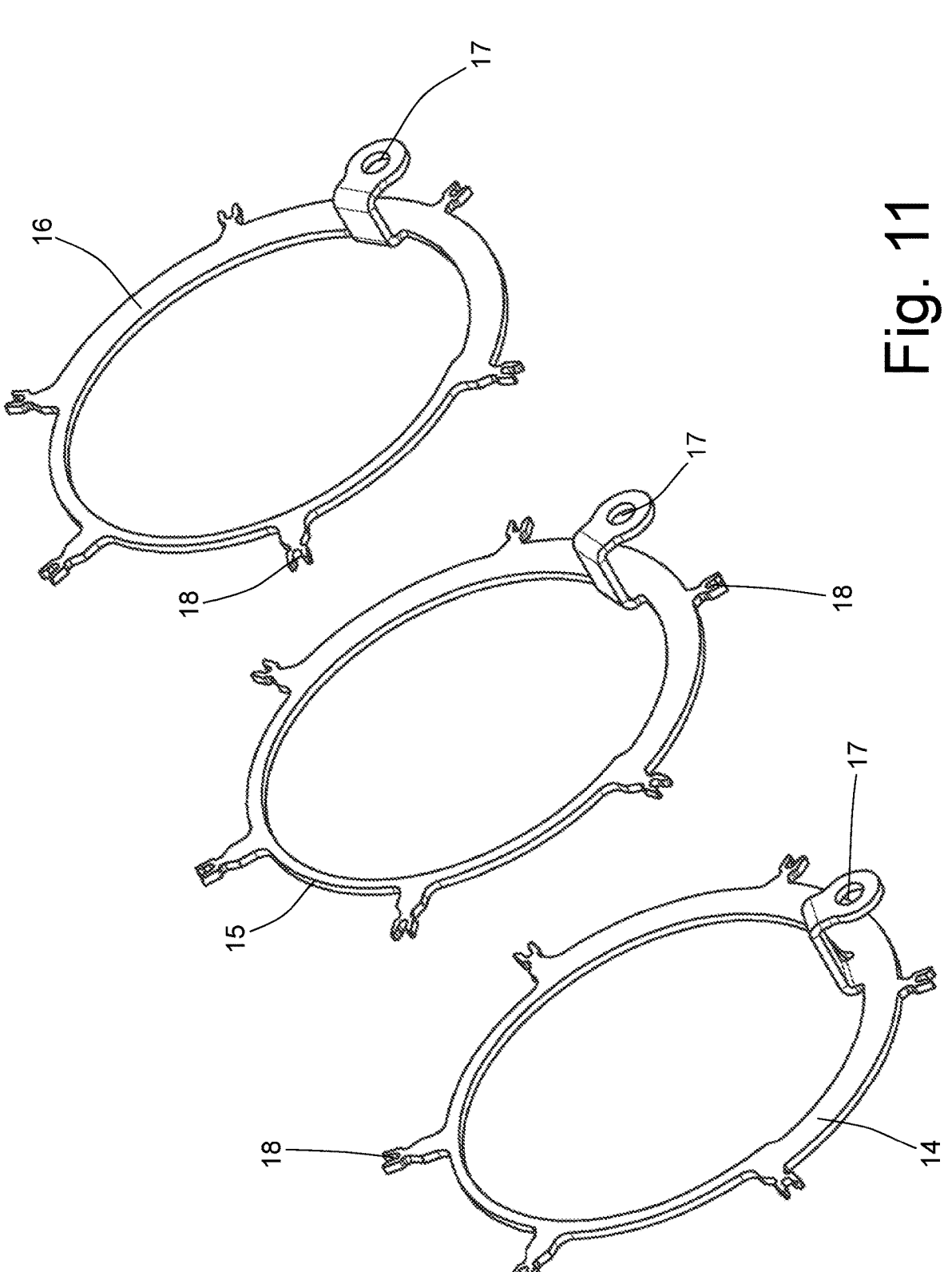
FIGS. 11 and 12 are respectively a perspective view and a plan view of a different embodiment of some connection bridges of FIG. 5 which is part of the present invention.
Figure 12:
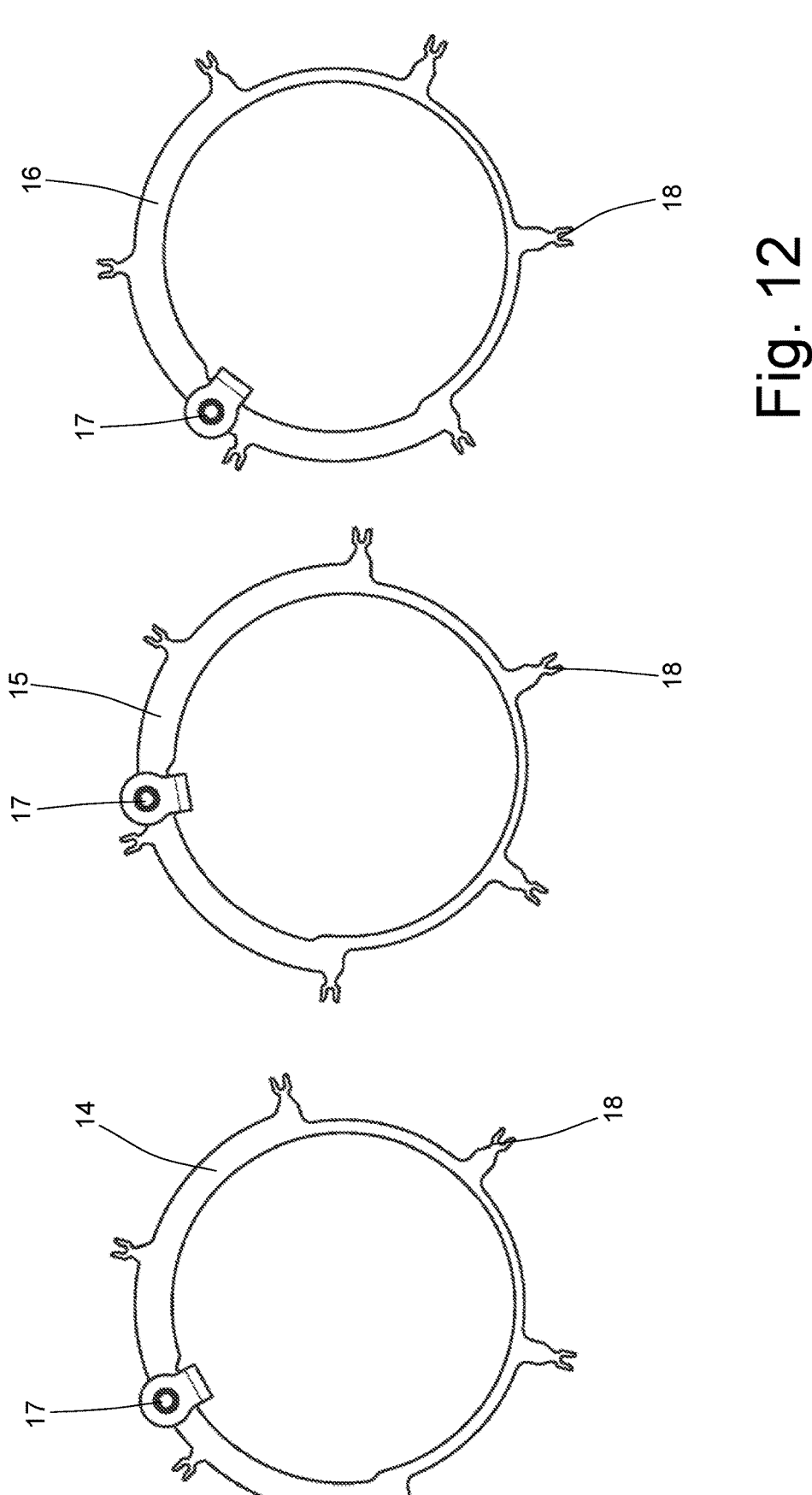

In the embodiment shown in FIGS. 11 and 12 and object of the present invention, the connection bridges 14, 15 and 16 have a closed circular (annular) shape, i.e. they close onto themselves without any interruption in their continuity. This embodiment is more advantageous, as it allows a more uniform distribution of the electric currents that cross each connection bridge 14, 15 or 16 and therefore allows for the same amount of conductive metal (typically copper) to reduce power losses by Joule effect or allows for the same amount of power losses by Joule effect to reduce the amount of conductive metal. In particular, in the embodiment shown in FIGS. 11 and 12 there are smaller connection bridges 14, 15 and 16 (i.e. with less conductive metal) allowing a lighter and also axially shorter three-phase stator winding 12 to be realized (the reduction in the dimensions of the connection bridges 14, 15 and 16 is also realized through a reduction in the axial thickness).

In particular, the reduction in the axial thickness of the connection bridges 14, 15 and 16 is particularly important as it allows to realize the connection bridges 14, 15 and 16 with an axial thickness of about 2 mm. The crimping forks 18 can have a maximum axial thickness of about 2 mm, so even if the axial thickness of the connection bridges 14, 15 and 16 is about 2 mm the crimping forks 18 and the connection bridges 14, 15 and 16 have the same thickness and therefore their realization is much simpler (in essence it is an operation of shearing a plate of uniform thickness); instead, if the axial thickness of the connection bridges 14, 15 and 16 is of the order of 3 mm or even higher, relatively complex additional machining is necessary in order to reduce the thickness of the crimping forks 18 to 2 mm.

According to a preferred embodiment shown in FIGS. 11 and 12, the connection bridges 14, 15 and 16 have a uniform (constant) axial thickness and have a variable radial width: the radial width of the connection bridges 14, 15 and 16 is greater near the pins 17 and is smaller on the opposite side of the pins 17; in other words, half of each connection bridge 14, 15 or 16 where the pin 17 is located has a greater radial width while the other half of each connection bridge 14, 15 or 16 opposite the pin 17 has a smaller radial width.

The use of the insulating supports 19, 22 and 24 allows to greatly simplify the coupling of the connection bridges 13-16 to the three-phase stator winding 12; in particular, it is possible to pre-assemble (and interlockingly lock) the connection bridges 13-16 in the corresponding seats 21, 23, 25 of the insulating supports 19, 22 and 24 away from the three-phase stator winding 12 and then couple together and in a single operation the ends 10 and 11 of the coils 8 to all the connection bridges 13-16. Furthermore, the insulating supports 19, 22 and 24 allow to stably maintain the connection bridges 13-16 in the desired position during the construction of the three-phase stator winding 12.

According to a possible embodiment, the cable 9 constituting the coils 8 is a wound litz cable and therefore consists of at least one strand of thin wires, which are individually insulated (typically by means of an enamel) and are twisted or woven together following one of the various known schemes that equal the proportion of the overall length along which each wire is outside the cable 9.

In the embodiments shown in the appended figures, there is provided a plurality of connection bridges 13, each of which defines a star connection of three coils 8 and constitutes a star centre of the three coils 8 by connecting an end 10 of each of the three coils 8 to one another; in this embodiment, the (six) connection bridges 13 (but the number of the connection bridges 13 could be different) are separated from one another and electrically isolated. According to a different embodiment not shown, there is provided a single connection bridge 13 which constitutes the star centre of all star connections and has a seamless circular shape closed onto itself.

The embodiments described herein can be combined with each other without departing from the scope of protection of the present invention.

The three-phase stator winding 12 described above has numerous advantages.

Firstly, the three-phase stator winding 12 described above has a high energy efficiency (i.e. a high yield between the mechanical or electrical power in input and the electrical or mechanical power in output).

Furthermore, the three-phase stator winding 12 described above has a high specific performance (power and/or torque), i.e. a high performance (power and/or torque) per unit of mass and/or of volume. In other words, with the same performance and compared to a similar known electric machine, the three-phase stator winding 12 described above has a reduction in the final overall dimensions and a substantial reduction in mass.

The realization of the three-phase stator winding 12 described above is easily realizable in a highly automated production plant.

Finally, the structure of the three-phase stator winding 12 described above (particularly of the connection bridges 13-16) allows two different electric machines 1 to be realized having (substantially) the same nominal performance (i.e. the same nominal power and the same nominal torque) against different nominal voltages (in particular one half of the other) without modifying the rotor, the magnetic core, and the connection bridges 13-16 (except to adapt the dimension of the crimping forks 18). In other words, by changing only the section of the conductor cable 9 (which is doubled), the number of turns of each coil (which is halved) and the dimension of the crimping forks 18, it is realized an electric machine 1 with the same performance but halved nominal supply voltage (for example from 800 Volts to 400 Volts). Therefore, with a reduced cost of the materials (many components are the same) and with a reduced cost of the plants (the assembly line is the same with a few and simple adjustments) it is possible to produce a range of "scalar" stator windings 12 having different nominal voltages but substantially equal nominal performance.

In other words, the connection bridges 13-16 constitute a "universal terminal block" that can be adapted without modifications to different nominal voltages.

LIST OF REFERENCE NUMBERS OF THE
FIGURES 1 electric machine
2 shaft 3 rotation axis
4 rotor
5 stator
6 magnetic core
7 magnetic poles
8 coils
9 conductor cable
10 ends
11 ends
12 three-phase stator winding
13 connection bridge
14 connection bridge
15 connection bridge
16 connection bridge
17 pin
18 crimping forks
19 internal insulating support
20 legs
21 seats
22 intermediate insulating support
23 seats
24 external insulating support
25 seats
26 separation panels

The invention claimed is:

1. A three-phase stator winding of a rotary electric machine and comprising:
   a plurality of coils each of which has two opposite ends;
   at least one first connection bridge which defines a star connection of at least three coils and constitutes a star centre of the three coils by connecting a first end of each one of the three coils to one another; and
   three second connection bridges which define a parallel connection of the star connections, are each provided with a corresponding pin defining a terminal of the three-phase stator winding towards the outside, and each of which connects a second end of a respective coil of each star connection to one another;
   wherein each second connection bridge has a circular shape closed onto itself without interruptions; and
   wherein each second connection bridge has a variable cross section along its circumferential extension.

2. The three-phase stator winding according to claim 1, wherein the cross-section of each second connection bridge is larger in the area of the pin and is smaller on the opposite side of the corresponding pin.

3. The three-phase stator winding according to claim 2, wherein each second connection bridge has a constant axial thickness and a variable radial width.

4. The three-phase stator winding according to claim 3, wherein a half of each second connection bridge where the pin is located has a larger radial width while the other half of each second connection bridge opposite the pin has a smaller radial width.

5. The three-phase stator winding according to claim 1 and comprising a plurality of first connection bridges, each of which defines a star connection of three coils and constitutes a star centre of the three coils by connecting a first end of each of the three coils to one another.

6. The three-phase stator winding according to claim 5, wherein the first connection bridges are arranged coplanar with each other side by side and all together make up a circumference.

7. The three-phase stator winding according to claim 5, wherein the first connection bridges are electrically insulated from one another.

8. The three-phase stator winding according to claim 5 and comprising an internal insulating support, which has an annular and circular shape, houses the first connection bridges, and is configured to be interposed between a magnetic core of a stator and the first connection bridges.

9. The three-phase stator winding-according to claim 8, wherein the first internal insulating support comprises a plurality of first seats, each of which reproduces in negative the shape of a corresponding first connection bridge and houses the corresponding first connection bridge.

10. The tree-phase stator winding according to claim 1, wherein the connection bridges are arranged axially stacked one above the other and intermediate insulating supports are interposed between the connection bridges.

11. The three-phase stator winding according to claim 10, wherein:
   the second connection bridges are axially superimposed on each other and are axially superimposed on the first connection bridge;
   there are provided three intermediate insulating supports which are interposed between the connection bridges and each of which has an annular and circular shape; and
   there is provided an external insulating support, which covers the axially outermost connection bridge and has an annular and circular shape.

12. The three-phase stator winding according to claim 11, wherein:
   each intermediate insulating support comprises second seats on both sides, each of which reproduces in negative the shape of a corresponding connection bridge (13-16) and houses the corresponding connection bridge; and
   the external insulating support comprises a third seat that reproduces in negative the shape of the axially outermost connection bridge (16) and houses the axially outermost connection bridge.

13. The tree-phase stator winding according to claim 1, wherein the ends of the coils and the connection bridges are all arranged on the same side in the area of the same head of the three-phase stator winding.

14. The three-phase stator winding-according to claim 1, wherein each coil is constituted by a litz-type conductor cable which consists of at least one strand of thin wires, which are individually insulated and are twisted or woven together.

15. The three-phase stator winding according to claim 1, wherein each coil is constituted by a conductor cable wound in a spiral shape around a corresponding magnetic pole of a magnetic core of a stator.

* * * * *